United States Patent Office 2,977,359
Patented Mar. 28, 1961

2,977,359

AMIDES AND HYDRAZONES OF PODOPHYLLIC ACID AND PICROPODOPHYLLIC ACID

Jürg Rutschmann, Oberwil, near Basel-Land, Switzerland, assignor to Sandoz A.G., Basel, Switzerland No Drawing. Filed June 2, 1958, Ser. No. 739,009

Claims priority, application Switzerland June 3, 1957

12 Claims. (Cl. 260—240)

This invention relates to amides and hydrazides of podophyllic acid and picropodophyllic acid and to the hydrazones formed by reacting the aforesaid hydrazides with a carbonyl compound. More particularly, the invention relates to podophyllic acid amides, hydrazides and hydrazones having the general structure

R—NH—Y wherein Y is (a) H, (b) N=C=R$_1$R$_2$ or

in which R is either trans C$_3$ epimer of podophyllic acid having the molecular formula C$_{22}$H$_{23}$O$_8$ or the C$_3$ epimer having the cis structure, i.e., picropodophyllic acid of molecular formula C$_{22}$H$_{23}$O$_8$; in which R$_1$ and R$_2$ represent hydrogen, or alkyl, or aryl, or cycloalkyl, or aralkyl, or alkaryl, or the nitro, hydroxy, amino, halo, sulfo, phospho, amino, alkoxy, and aryloxy substituted aryl and alkaryl radicals, or a 4, 5 or 6 membered sulfur, oxygen or nitrogen containing heterocyclic radical such as thienyl, furyl, pyridyl, or these heterocyclic radicals, substituted in the same manner as the aforesaid aryl and alkaryl radicals; and in which

is a carbocyclic or heterocyclic six membered ring formed by hydrazone formation between a carbocyclic or heterocyclic ketone and the hydrazide of formula

R—NH—NH$_2$

The hydrazones (b) and (c) above are formed from the podophyllic acid hydrazide or picropodophyllic acid hydrazide by reaction with a carbonyl compound, i.e., an aliphatic, cycloaliphatic or aromatic aldehyde, or ketone.

Among aldehydes which may be typically used are acetaldehyde, benzaldehyde, salicyl aldehyde, 4-dimethyl amino benzaldehyde, pyridine-4-aldehyde, anisyl aldehyde, phenyl acetaldehyde, pyridine-2-aldehyde, pyridine-3-aldehyde, palmityl aldehyde, octadecanal, tridecanal, myristic aldehyde, lauryl aldehyde and capryl aldehyde.

The aliphatic ketone may be a monoketone, e.g., acetone, methyl n-vinyl ketone, etc., or a polyketone, e.g., diacetyl, and it may be substituted with halogen, hydroxy, amino, carboalkoxy, sulfo, alkoxy, aryloxy, etc., e.g., acetoacetic ester, chloroacetone, dimethyl amino acetone, diacetone alcohol, etc.

The ketone may be of the mixed aliphatic aromatic type, e.g., acetophenone or may be a purely aromatic ketone, e.g., diphenyl ketone or may be a heterocyclic ketone.

The carbocyclic radical of either the aldehyde or ketone may be a mononuclear or binuclear carbocyclic aromatic radical, e.g., phenyl or naphthyl, or an alkyl-substituted mononuclear or binuclear carbocyclic aromatic radical, e.g., tolyl, methyl naphthyl, or a lower alkoxy-substituted mononuclear or binuclear radical, e.g., methoxy phenyl, dimethoxyphenyl, methoxy beta-naphthyl, methoxy alpha-naphthyl, or halogen-substituted aromatic radical, e.g., chlorophenyl, chloronaphthyl, sulfonyl-substituted radical, or a sulfuric acid-substituted aryl radical, e.g., sulfophenyl, or a nitro-substituted aryl radical, e.g., nitrophenyl, or an amine-substituted alkaryl radical such as dimethyl aminophenyl or dimethyl-1-aminonaphthyl.

Due to the ready availability of a vast number of carbonyl compounds for hydrazone formation along the lines indicated above, it will be appreciated that hydrazone formation permits a great variety of radicals to be substituted in the terminal nitrogen atom of the podophyllic acid and picropodophyllic acid hydrazines of the invention in order to provide the corresponding hydrazones.

UTILITY

The foregoing podophyllic acid amides, hydrazides and hydrazones of the invention are distinguished therapeutically from the lactones from which they originate in that they exhibit very low toxicity and this constitutes their main advantage over the toxic podophyllotoxin and picropodophyllin.

The characteristics of podophyllin are given at page 1052 of the text by Goodman and Gilman, The Pharmacological Basis of Therapeutics, second edition (MacMillan 1955):

"The cytotoxic action of podophyllin appears to be due largely to one of its components, 'podophyllotoxin.' . . . Podophyllotoxin is a highly toxic substance with an intravenous LD of a few milligrams per kilogram in most species."

As in the case of podophyllin, the compounds of the invention have further utility in the treatment of condylomata acuminata but have the additional advantage of lower toxicity whereas podophyllin is quite toxic.

As stated in the text by Goodman & Gilman referred to hereinabove, the podophyllum resin presumably exerts its cathartic effect by an irritant, cytotoxic action on the intestinal tract and small amounts (up to 5 milligrams) produce copious, soft stools within 12 to 24 hours. Beyond 5 milligrams, the cytotoxic properties of the resin are clearly seen: the stool becomes very watery and may become bloody. Podophyllin is uncertain in its action, and a mild dose for one individual may purge another severely. Furthermore, its high systemic toxicity and general cytotoxic action preclude its safe employment as a cathartic.

The above disadvantages are eliminated by the compounds of the invention which act as mild laxatives or cathartics. The laxative action can be controlled by appropriate dosage of the order of 10 milligrams and does not lead to uncontrollable diarrhea as observed in the instances where podophyllotoxin is used or where podopyllum resin U.S.P. is used.

The discovery that the foregoing amide, hydrazide and hydrazone compounds of the invention eliminate the severe purgative characteristics of podophyllin as well as its high systemic toxicity permits the utilization of these podophyllic acid derivatives of the invention as improved cathartics.

THE C$_3$ PICROPODOPHYLLIN EPIMER

It is known that podophyllotoxin shows an antimitotic effect. See M. G. Kelly and J. L. Hartwell, J. Nat. Cancer Inst., 14, 967 (1954). It is also known that picropodophyllin (II), a product of the reaction of podophyllotoxin with weak alkalis.

I

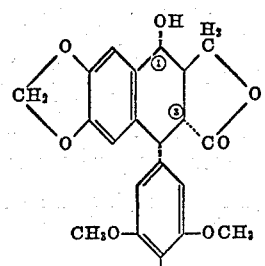

II

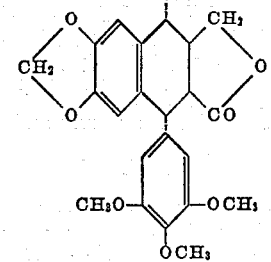

is ineffective as an anti-mitotic agent. The reaction is, therefore, merely of chemical interest. For practical therapeutic use as an anti-mitotic agent, picropodophyllin is ineffective and unsuitable.

Podophyllotoxin and picropodophyllin show the relationship of diastereo-isomers respectively due to epimerism at the $C_3$ position. The lactone group of podophyllotoxin is trans located while the lactone group of picropodophyllin is cis located.

The toxicity of the podophyllotoxin group is of great significance in therapeutical use. In the case of podophyllotoxin itself, the relationship of effectiveness and toxicity is so unfavorable that there has been no possibility for practical use. For example, as stated in the Goodman and Gilman text at page 1052:

"However, the high toxicity of podophyllin will probably preclude its systemic administration in the therapy of malignancy."

Attempts were therefore made to find more suitable derivatives for therapeutical application and one of the results of those efforts is podophyllotoxin-glucoside. See A. Stoll, J. Reny and A. Von Wartburg, J. Amer. Chem. Soc., 76, 3103 (1954). This substance is as effective anti-mitotically as podophyllotoxin but possesses greater solubility in water and lower toxicity than podophyllotoxin. However, the glucoside represents only about 10% of the anti-mitotic podophyllotoxin principal and the main portion of the total represents therapeutic waste.

FORMATION OF HYDRAZIDES

In accordance with the present invention, the hydrazides of Formulas III and IV hereinbelow:

III

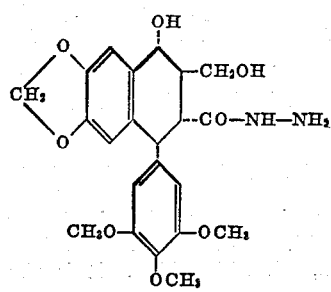

IV

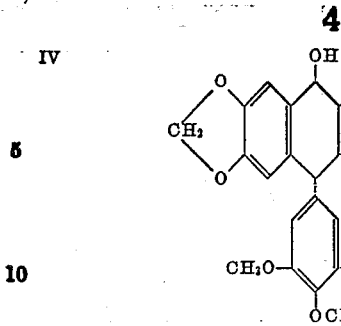

may be obtained from the two corresponding lactones, the natural podophyllotoxin and its $C_3$ epimer picropodophyllin, the product of reaction with an alkali and splitting of the lactone ring with hydrazine. This reaction has been carried out by W. Borsche and J. Niemann (Ann. Chem., 499, 59–1932) whereby a so-called "podophyllic acid hydrazide" was obtained from the two lactones as the only product resulting from the reaction.

Thorough examination of this reaction reveals that by splitting the picropodophyllin with hydrazine, a compound is produced with nearly the same characteristics as those described by Borsche and Niemann in substantially quantitative yield. This compound is labelled in the following description as picropodophyllic acid hydrazide IV because of its stereochemical relation.

Compound IV can also be obtained by treating podophyllotoxin with hydrazine whereby the lactone epimerizes under alkaline conditions during the reaction and forms picropodophyllin.

In addition to the corresponding hydrazide IV, a second stereoisomeric hydrazide III is found and this compound is obtained from the podophyllotoxin without epimerization. It has been found that stereoisomeric product III is practically the only product obtained if the hydrazine splitting of the podophyllotoxin is carried out in the presence of an acid buffer in an amount to reduce the alkalinity of the reaction medium and to thereby diminish the rearrangement of the podophyllotoxin configuration into the epimeric picropodophyllin configuration. A preferred method for this type of splitting employs acetic acid as a buffer and is shown in Example II herein. Verification of the assumptions regarding the stereochemistry of the two hydrazides was demonstrated by transformation of the hydrazides back into the original lactones.

PREPARATION OF HYDRAZONES

It has been found that new, anti-mitotically effective hydrazones of the podophyllic or picropodophyllic acid hydrazide may be obtained by reacting with carbonyl compounds in accordance with the method of the present invention and which show a mitosis-inhibiting effect similar to that of podophyllotoxin without the toxicity of the latter.

It was previously assumed that the anti-mitotic effect of the compounds of the podophyllotoxin series depended on the presence of an intact lactone ring. Contrary to this assumption, it has now been found that hydrazones of the podophyllotoxin with an open lactone ring can have the same effect.

The pharmacological effect discovered for the instant hydrazone derivatives of picropodophyllic acid, therefore, are not only of general therapeutic interest but represent the first known basis for practical therapeutic application of picropodophyllin.

In a preferred method of forming the hydrazone, the podophyllic or picropodophyllic hydrazide is dissolved in an inert solvent such as aliphatic alcohol and mixed with at least a molar quantity of the carbonyl compound, i.e., aldehyde or ketone at ambient or slightly above ambient temperature (15–30° C.) whereby the condensation is usually finished within a short time. In certain cases, the carbonyl compound itself may be employed both as a solvent and reactant for the hydrazone-forming reaction. The reaction products are readily separated by concentrating the solution and crystallization, or by precipitation through addition of liquid non-solvents to the inert solvent.

The new derivatives of the podophyllic acid or picropodophyllic acid respectively are solid, amorphous or crystalline compounds at room temperature. They are intended for therapeutical use.

FORMATION OF PODOPHYLLIC ACID AMIDES

To arrive at the new amide having the general formula R—NH$_2$ in which R represents the radical C$_{22}$H$_{23}$O$_8$ of the stereoisomeric podophyllic and picropodophyllic acid, the stereoisomeric hydrazides having the general formula R—NH—NH$_2$ are treated with metals acting as hydrogenation catalysts, preferably with Raney-nickel.

In the present method the hydrazide is heated with at least the molar quantity of Raney-nickel in an inert solvent such as a lower aliphatic alcohol, the reaction time being dependent on the temperature employed. If ethanol is used at boiling point, the reaction is finished after one or two hours. Since Raney-nickel often contains alkali from its preparation, which could disturb the hydrolysis-sensitive hydrazides, it is desirable to work in the presence of a neutralizing agent. For this purpose, acetic acid ethyl ester may be added to the solvent which will be immediately transformed into the alkali acetate through reaction with the free alkali. It is unexpected that this known reaction (C. Ainsworth, J. American Chemical Society, 76, 5774, 1954; 78, 1636, 1956) could be applied in the case of the hydrazides since experience shows that in similar reactions of the podophyllotoxin series under the required conditions, there is a danger that a lactone ring may form, splitting off hydrazine.

The pronounced anti-mitotic, tumor-inhibitive effect of the new amide compound is connected with a toxicity which is considerably less than that of podophyllin. Since the high toxicity of podophyllotoxin has rendered it useless for clinical application, the new amides of the podophyllic acids and of the picropodophyllic acids gain great significance.

The invention makes it possible for the main portion of the podophyllum resin, the podophyllotoxin, which because of its high degree of toxicity was not suitable for use as an anti-mitotic, to be transformed by a technically simple process into highly effective compounds which are suitable for practical use.

The new derivatives of the podophyllic and picropodophyllic acids, produced in accordance with the present invention, crystallize at room temperature. They are intended for therapeutic use but are also suitable as intermediate products.

The following examples illustrate the invention.

*Example I*

A solution of 50 grams of picropodophyllin dissolved in 100 cubic centimeters of methanol was boiled with 10 cubic centimeters of anhydrous hydrazine for one hour on a boiling water bath. The methanol solvent was boiled off to complete dryness and the residue was crystallized with twenty times the amount of boiling water. Picropodophyllic acid hydrazide was obtained as a homogeneous solid in the form of rhombic scales having a melting point of 152–154° C. $(\alpha)_D = -106°$ (c.=0.4 in ethyl alcohol). The hydrazine was reacted with acetone and picropodophyllic acid isopropyliden hydrazide was obtained. After recrystallization in acetone-water, the hydrazone was purified and had a melting point of 128–130° C. $(\alpha)_D = -98°$ (c.=0.4 in chloroform).

*Example II*

A solution of 50 grams of podophyllotoxin dissolved in 50 cubic centimeters of methanol was heated with 10 cubic centimeters of glacial acetic acid and 10 cubic centimeters of anhydrous hydrazine for one hour on a boiling water bath. The solution was then concentrated in a vacuum until completely dry and the residue was crystallized with 20 times the quantity of methanol. Podophyllic acid hydrazide was obtained as a homogeneous solid in the form of prisms and having a melting point of 198–199° C. $(\alpha)_D = -202°$ (c.=0.4 in ethyl alcohol). In accordance with the procedure outlined in Example I, the hydrazide reacted with acetone yields podophyllic acid isopropyliden hydrazide having a melting point of 128–130° C. $(\alpha)_D = -246°$ (c.=0.4 in chloroform).

*Example III*

A solution of 2.23 grams of picropodophyllic acid hydrazide dissolved in 5 cubic centimeters of methanol was heated with 700 milligrams of benzaldehyde for one hour on a boiling water bath. After concentration in a vacuum, picropodophyllic acid benzyliden hydrazide having a melting point of 218–220° C. was obtained by crystallization with methanol.

*Example IV*

In accordance with the procedure outlined in Example III, podophyllic acid benzyliden hydrazide was obtained in the form of a white powder as a result of the reaction of podophyllic acid hydrazide and benzaldehyde followed by precipitation with ether from a benzene solution. The hydrazide had a melting point of 142–144° C.

*Example V*

In accordance with the procedure outlined in Example III and using the same amount of aldehyde, picropodophyllic acid anisyliden hydrazide was obtained from the reaction of 2.23 grams of picropodophyllic acid hydrazide and 700 milligrams of anisyl aldehyde. The compound was obtained by precipitation from a benzene solution with ether, and had a melting point of 130–132° C.

*Example VI*

A solution of 2.23 grams of picropodophyllic acid hydrazide dissolved in 5 cubic centimeters of methanol was boiled with 800 milligrams of phenyl acetaldehyde for one hour on a boiling water bath. After concentration, the residue was recrystallized from benzene. The picropodophyllic acid phenylethyliden hydrazide obtained in accordance with this procedure had a melting point of 205–206° C.

*Example VII*

In accordance with the procedure outlined in Example VI, podophyllic acid phenylethyliden hydrazide was obtained from the reaction of podophyllic acid hydrazide and phenyl acetaldehyde. The hydrazide was obtained by precipitation from a benzene solution with ether and was in the form of an amorphous powder.

*Example VIII*

A solution of 1 gram of podophyllic acid hydrazide with 2.5 grams of freshly prepared Raney-nickel in 25 cubic centimeters of ethanol and 5 cubic centimeters of acetic acid ethyl ester was heated for two hours at reflux to the boiling point. The solution was filtered off the Raney-nickel and concentrated to a small volume. The podophyllic acid amide crystallized after cooling and had a melting point of 205–206° C. $(\alpha)_D = -213°$ (c.=0.4 in ethanol).

*Example IX*

A solution of 2 grams of picropodophyllic acid hydrazide with 5 grams of freshly prepared Raney-nickel in 50 cubic centimeters of ethanol and 10 cubic centimeters of acetic acid ethyl ester was boiled for two hours. The solution was filtered off and the liquid evaporated. The picropodophyllic acid amide was crystallized with acetic acid ethyl ester, and had a melting point of 133–134° C. $(\alpha)_D = -98°$ (c.=0.4 in ethanol).

Example X 9.0 grams of podophyllic acid hydrazide and 3.0 grams of capryl aldehyde were dissolved in 10 cubic centimeters of benzene by warming and mixing for two or three minutes on a boiling water bath. The solution was heated for an additional ten minutes, 10 cubic centimeters of benzene were added and the mixture was then cooled to room temperature. The condensation product was precipitated as a resin after the addition of 50 cubic centimeters of ether and 50 cubic centimeters of petroleum ether. The pure podophyllic acid n-octyliden hydrazide was obtained in the form of a white powder having a specific rotation of $(\alpha)_D = -234°$ (c.=0.5. in ethanol).

Example XI

In accordance with the procedure outlined in Example X, but using decanal instead of octanal, podophyllic acid n-decyliden hydrazide was obtained by condensation of 9.0 grams of podophyllic acid hydrazide with 3.5 grams of capric aldehyde. The hydrazide had a specific rotation of $(\alpha)_D = -215°$ (c.=0.5 in ethanol).

Example XII

In accordance with the procedure outlined in example X, but using undecanal instead of octanal, podophyllic acid n-undecyliden hydrazide was obtained by condensation of 9.0 grams of podophyllic acid hydrazide with 4.0 grams of undecanal. The hydrazide had a specific rotation of $(\alpha)_D = -216°$ (c.=0.5 in ethanol).

Example XIII

In accordance with the procedure outlined in Example X, but using dodecanal instead of octanal, podophyllic acid n-dodecyliden hydrazide was obtained by condensation of 9.0 grams of podophyllic acid hydrazide with 4.5 grams of lauryl aldehyde. The specific rotation was $(\alpha)_D = -208°$ (c.=0.5 in ethanol).

Example XIV

In accordance with the procedure outlined in Example X, but using tridecanal instead of octanal, podophyllic acid n-tridecyliden hydrazide was obtained by condensation of 9.0 grams of podophyllic acid hydrazide with 5.0 grams of tridecanal. The specific rotation was $(\alpha)_D = -188°$ (c.=0.5 in ethanol).

Example XV

In accordance with the procedure outlined in Example X, but using tetradecanal instead of octanal, podophyllic acid n-tetradecyliden hydrazide was obtained by condensation of 9.0 grams of podophyllic acid hydrazide and 5.5 grams of myristyl aldehyde. The specific rotation was $(\alpha)_D = -198°$ (c.=0.5 in ethanol).

Example XVI

A solution of 9.0 grams of podophyllic acid in 15 cubic centimeters of benzene with 6.2 grams of freshly distilled palmityl aldehyde was heated for 12 minutes. Podophyllic acid n-hexadecyliden hydrazide was then precipitated from the benzene solution as an amorphous powder. The specific rotation was $(\alpha)_D = -202°$ (c.=0.5 in ethanol).

Example XVII

In accordance with the procedure of Example XVI, podophyllic acid n-octadecyliden hydrazide was obtained by condensation of 15.0 grams of podophyllic acid hydrazide with 11.4 grams of stearyl aldehyde in 25 cubic centimeters of benzene, followed by precipitation with petroleum ether. Specific rotation: $(\alpha)_D = -195°$ (c.=0.5 in ethanol).

Example XVIII

A solution of 2.23 grams of podophyllic acid hydrazide and 1 cubic centimeter of n-caproic aldehyde in 5 cubic centimeters of methanol was heated for two hours at reflux. Evaporation was carried out to dryness, and the residue was dissolved in benzene. The mixture was shaken first with 2-N hydrochloric acid and then with sodium bicarbonate solution after which, the solution was concentrated to a small volume and the podophyllic acid hexliden hydrazide precipitated by adding ether. The hydrazide was in the form of an amorphous powder. Specific rotation: $(\alpha)_D = -259°$ (c.=0.5 in ethanol).

Example XIX

In accordance with the procedure outlined in Example XVIII, picropodophyllic acid hexyliden hydrazide was obtained with picropodophyllic acid hydrazide and n-caproic aldehyde. The hydrazide was crystallized with acetic acid ester, and had a melting point of 187–188° C. Specific rotation: $(\alpha)_D = -72.1°$ (c.=0.5 in ethanol).

Example XX

In accordance with the procedure outlined in Example XVIII, podophyllic acid cyclohexyliden hydrazide was obtained from podophyllic acid hydrazide and cyclohexanone. The hydrazide was precipitated from ether as a white amorphous powder. Specific rotation: $(\alpha)_D = 250°$ (c.=0.5 in ethanol).

Example XXI

In accordance with the procedure of Example XVIII, picropodophyllic acid hydrazide and cyclohexanone yielded picropodophyllic acid cyclohexyliden hydrazide which was crystallized from chloroform-methanol. The product had a melting point of 226–227° C. $(\alpha)_D = -29.9°$ (c.=0.6 in chloroform-methanol 1:1).

Example XXII

A solution of 2.23 grams of podophyllic acid hydrazide and 650 milligrams of 1-methyl-1,4-piperidone in 5 cubic centimeters of methanol was heated for two hours at reflux. The solution was evaporated to complete dryness, followed by precipitation of the podophyllic acid (1-methyl-4-piperidyliden) hydrazide with benzene and ether. Specific rotation $(\alpha)_D = -240°$ (c.=0.5 in chloroform).

Example XXIII

In accordance with the procedure outlined in Example XXII, picropodophyllic acid (1-methyl-4-piperidyliden) hydrazide was obtained from picropodophyllic acid hydrazide and 1-methyl-4-piperidone. Crystallization was carried out with chloroform-methanol. The product had a melting point of 233–234° C. Specific rotation:

$$(\alpha)_D = -34.4°$$

(c.=0.6 in chloroform-methanol 1:1).

Example XXIV

A solution of 2.23 grams of picropodophyllic acid hydrazide and 700 milligrams of acetophenone in 5 cubic centimeters of methanol were boiled for two hours at reflux. The solution was condensed by vacuum until dry and the picropodophyllic acid (1-phenyl-ethyliden) hydrazide was crystallized with methanol acetic acid ester. The melting point of the hydrazide was 212–213° C. Specific rotation: $(\alpha)_D = -59.8°$ (c.=0.5 in ethanol).

Example XXV

A solution of 2.23 grams of podophyllic acid hydrazide and 720 milligrams of 4-toluyl aldehyde in 5 cubic centimeters of methanol was heated for two hours at reflux. The solution was concentrated in a vacuum, dissolved in benzene and then shaken with 2-N hydrochloric acid and then with sodium bicarbonate solution. The benzene solution was concentrated to a small volume and podophyllic acid 4-methyl benzyliden hydrazide was precipitated as a white amorphous powder by adding ether. Specific rotation: $(\alpha)_D = -319°$ (c.=0.4–0.5 in ethanol).

Example XXVI

In accordance with the procedure outlined in Example XXV, picropodophyllic acid 4-methyl benzyliden hydrazide was obtained as a white amorphous powder by reaction of 2.23 grams of picropodophyllic acid hydrazide and 4-toluyl aldehyde. $(\alpha)_D = -80.4°$ (c.=0.4–0.5 in ethanol).

Example XXVII

In accordance with the procedure outlined in Example XXV, podophyllic acid 3,4-dimethoxy benzyliden hydrazide was obtained by reaction of 2.23 grams of podophyllic acid hydrazide and 1.18 grams of verartryl aldehyde. The hydrazide was recovered as a white amorphous powder with $(\alpha)_D = -255°$ (c.=0.4–0.5 in ethanol).

Example XXVIII

In accordance with the procedure outlined in Example XXV, picropodophyllic acid 3,4-dimethoxy benzyliden hydrazide was obtained by reaction of 2.23 grams of picropodophyllic acid hydrazide and 1.18 grams of verartryl aldehyde. $(\alpha)_D = -105°$ (c.=0.4–0.5 in ethanol).

Example XXIX

According to the method of Example XXV, podophyllic acid 2-naphthylmethylen hydrazide was obtained from reaction of 2.23 podophyllic acid hydrazide and 940 milligrams of 2-naphthyl aldehyde. Specific rotation:

$(\alpha)_D = -329°$ (c.=0.4–0.5 in ethanol).

Example XXX

In accordance with the procedure outlined in Example XXIX, picropodophyllic-2-naphthyl-1-methylenehydrazide was obtained from picropodophyllic hydrazide. The product was crystallized from glacial acetic ester and had a melting point of 223–225° C. Specific rotation: $(\alpha)_D = -58.1°$ (c.=0.4–0.5 in ethanol).

Example XXXI

In accordance with the procedure outlined in Example XXV, podophyllic acid-2-chloro-benzyliden hydrazide was obtained from 2.23 grams of podophyllic acid hydrazide and 840 milligrams of 2-chlorobenzaldehyde. The product was recovered as a white amorphous powder. Specific rotation $(\alpha)_D = -310°$ (c.=0.4–0.5 in ethanol).

Example XXXII

In accordance with the procedure outlined in Example XXXI, picropodophyllic acid-2-chloro-benzyliden hydrazide was obtained with picropodophyllic acid hydrazide and 2-chlorobenzaldehyde. The product was crystallized from acetic ester, and had a melting point of 202–203° C. Specific rotation $(\alpha)_D = -70.2°$ (c.=0.4–0.5 in ethanol).

Example XXXIII

In accordance with the procedure outlined in Example XXXI, podophyllic acid-3-chlorobenzyliden hydrazide was obtained from podophyllic acid hydrazide and 3-chlorobenzaldehyde. Specific rotation $(\alpha)_D = -295°$ (c.=0.4–0.5 in ethanol)

Example XXXIV

In accordance with the procedure outlined in Example XXXI, picropodophyllic acid-3-chloro-benzyliden hydrazide was obtained from 3-chlorobenzaldehyde and picropodophyllic acid hydrazide. The product was crystallized with acetic ethyl ester, and had a melting point of 205–206° C. Specific rotation: $(\alpha)_D = -81.6°$ (c.=0.4–0.5 in ethanol).

Example XXXV

In accordance with the procedure outlined in Example XXXI, podophyllic acid-4-chloro-benzyliden hydrazide was obtained from podophyllic acid hydrazide and 4-chlorobenzaldehyde. The product was obtained in amorphous form. Specific rotation: $(\alpha)_D = -302.8°$ (c.=0.4–0.5 in ethanol)

Example XXXVI

In accordance with the procedure outlined in Example XXXI, picropodophyllic acid-4-chloro-benzyliden hydrazide was obtained from 4-chlorobenzaldehyde and picropodophyllic acid hydrazide. The product was obtained in amorphous form. Specific rotation: $(\alpha)_D = -68.7°$ (c.=0.4–0.5 in ethanol).

Example XXXVII

In accordance with the procedure outlined in Example XXV, podophyllic acid furfuryliden hydrazide was obtained from podophyllic acid hydrazide and 580 grams of furfural. The product was obtained in amorphous form. Specific rotation: $(\alpha)_D = -347°$ (c.=0.4–0.5 in ethanol).

Example XXXVIII

In accordance with the procedure outline din Example XXXVII, picropodophyllic acid furfuryliden hydrazide was obtained from picropodophyllic acid hydrazide and furfural. The substance was crystallized from acetic acid ester, and had a melting point of 211–213° C. Specific rotation: $(\alpha)_D = -92.4°$ (c.=0.4–0.5 in ethanol).

Example XXXIX

In accordance with the procedure outlined in Example XXV, podophyllic acid thienyliden hydrazide was obtained from podophyllic acid hydrazide reacted with 680 milligrams of thiophene-2-aldehyde. The product obtained was in amorphous form. $(\alpha)_D = -340°$ (c.=0.4–0.5 in ethanol).

Example XXXX

In accordance with the procedure outlined in Example XXXIX, picropodophyllic acid thienyliden hydrazide was obtained from picropodophyllic acid hydrazide and thiphene-2-aldehyde. The product obtained was in amorphous form. $(\alpha)_D = -91.9°$ (c.=0.4–0.5 in ethanol).

Example XXXXI

A solution of 2.23 grams of podophyllic acid hydrazide and 650 milligrams of pyridine-2-aldehyde in 5 cubic centimeters of methanol was heated for two hours at reflux. The mixture was concentrated under vacuum and the residue dissolved in benzene. Podophyllic acid-2-pyridylmethylene hydrazide was precipitated as an amorphous white powder. $(\alpha)_D = -316°$ (c.=0.4–0.5 in ethanol).

Example XXXXII

In accordance with the procedure outlined in Example XXXXI, picropodophyllic acid hydrazide and pyridine-2-aldehyde were reacted to obtain picropodophyllic acid-2-pyridylmethylene-hydrazide which was crystallized with benzene. The product had a melting point of 200–201° C. Specific rotation: $(\alpha)_D = -59.4°$ (c.=0.4–0.5 in ethanol).

Example XXXXIII

In accordance with the procedure outlined in Example XXXXI, podophyllic acid-3-pyridyl-methylene hydrazide was obtained from podophyllic acid hydrazide and pyridine-3-aldehyde. The product was amorphous $(\alpha)_D = -305°$ (c.=0.4–0.5 in ethanol).

Example XXXXIV

In accordance with the procedure outlined in Example XXXXI, picropodophyllic acid-3-pyridylmethylene hydrazide was obtained from picropodophyllic acid hydrazide and pyridine-3-aldehyde. The product was

11 crystallized from benzene and had a melting point of 209–210° C. Specific rotation $(\alpha)_D = -69.5°$ (c.=0.4–0.5 in ethanol).

*Example XXXXV*

In accordance with the procedure outlined in Example XXXXI, podophyllic acid-4-pyridyl-methylene hydrazide was obtained with podophyllic acid hydrazide and pyridine-4-aldehyde. The product was crystallized from methanol and had a melting point of 142–144° C. Specific rotation $(\alpha)_D = -322°$ (c.=0.4–0.5 in ethanol).

*Example XXXXVI*

In accordance with the procedure outlined in Example XXXXI, picropodophyllic acid-4-pyridylmethylene hydrazide may be obtained from picropodophyllic acid hydrazide and pyridine-4-aldehyde. The product was crystallized from a mixture of methanol, benzene and ethyl ether, and was amorphous. $(\alpha)_D = -65.9°$ (c.=0.4–0.5 in ethanol).

*Example XXXXVII*

In accordance with the procedure outlined in Example XXXXI, podophyllic acid 4-dimethylamino-benzyliden hydrazide was obtained from picropodophyllic acid hydrazide and 4-dimethylamino benzaldehyde. The product was crystallized from a mixture of chloroform, methanol and ethyl ether, and was amorphous. $(\alpha)_D = -316°$ (c.=0.4–0.5 in ethanol).

*Example XXXXVIII*

In accordance with the procedure outlined in Example XXXXI, picropodophyllic acid 4-dimethylaminobenzyliden hydrazide is obtained from picropodophyllic acid hydrazide and 4-dimethylamino benzaldehyde. The substance was crystallized from a mixture of chloroform, methanol and acetic acid ester. The product had a melting point of 200–203° C. Specific rotation $(\alpha)_D = -101°$ (c.=0.4–0.5 in ethanol).

*Example XXXXIX*

In accordance with the procedure outlined in Example XXV, podophyllic acid salicyliden hydrazide was obtained from 2.23 grams of podophyllic acid hydrazide and 740 milligrams of salicyl aldehyde. The product was amorphous. $(\alpha)_D = -216°$ (c.=0.4–0.5 in ethanol).

*Example L*

In accordance with the procedure outlined in Example XXXXIX, picropodophyllic acid salicyliden hydrazide was obtained from picropodophyllic acid hydrazide and salicyl aldehyde. The product was amorphous. $(\alpha)_D = -151°$ (c.=0.4–0.5 in ethanol).

*Example LI*

A solution of 2.23 grams of podophyllic acid hydrazide and 1.0 sodium benzaldehyde-3-sulfonate was heated in 5 cubic centimeters of methanol for three hours at reflux. Podophyllic acid 3-sulfonyl-benzyliden hydrazide as the sodium salt was precipitated as an amorphous substance by adding isopropanol to the reaction mixture. A white powder was obtained after repeated precipitation from methanol-isopropanol. $(\alpha)_D = -259°$ (c.=0.4–0.5 in ethanol).

*Example LII*

In accordance with the procedure outlined in Example LI, picropodophyllic acid 3-sulfonyl-benzyliden hydrazide as the sodium salt was obtained in the form of a white amorphous powder from picropodophyllic acid hydrazide and sodium benzaldehyde-3-sulfonate. $(\alpha)_D = -43.7°$ (c.=0.4–0.5 in ethanol).

*Example LIII*

In accordance with the procedure outlined in Example XXV, podophyllic acid anisyliden hydrazide was obtained in the form of an amorphous product from 2.23 grams of podophyllic acid hydrazide and 820 milligrams of anisyl aldehyde. $(\alpha)_D = -311°$ (c.=0.4–0.5 in ethanol).

In Examples IV, V, VII, X, XI, XII, XIII, XIV, XV, XVIII, XXII, XV, XVI, XVII, XVIII, XIX, XXX, XXXI, XXXII, XXXIII, XXXIV, XXXV, XXXVI, XXXVII, XXXVIII, XXXIX, XXXX, the ether which was used to precipitate the hydrazone from the solution in which it was formed was diethyl ether.

The invention is further described in the claims which follow.

Having thus disclosed the invention, what is claimed is:

1. A compound selected from the class consisting of hydrazones of the general formula

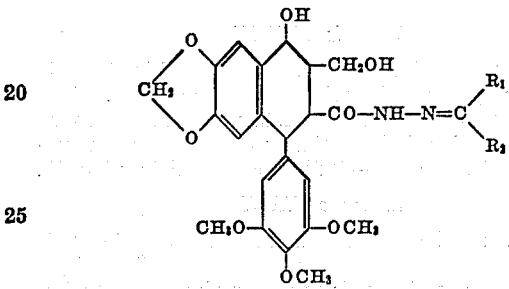

in which $R_1$ is a member selected from the group consisting of hydrogen and methyl and $R_2$ is a member selected from the group consisting of alkyl containing from 1 to 20 carbon atoms, aralkyl containing from 7 to 10 carbon atoms, phenyl, naphthyl, 2-furyl, 2-thenyl, 2-pyridyl, 3-pyridyl, 4-pyridyl, cyclohexyl, 1-methyl-4-piperidyl, aryl substituted by alkyl containing from 1 to 4 carbon atoms, aryl substituted by chlorine, aryl substituted by hydroxyl, aryl substituted by 1 to 2 alkoxyl containing from 1 to 4 carbon atoms, aryl substituted by dialkylamine containing from 2 to 8 carbon atoms, the trans $C_3$ epimer of podophyllic acid having the molecular formula $C_{22}H_{23}O_8$ being designated by the structure

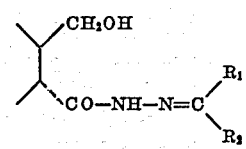

2. A compound selected from the class consisting of hydrazones of the general formula

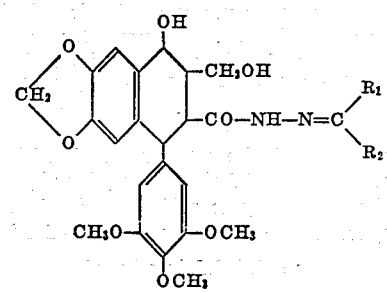

in which $R_1$ is a member selected from the group consisting of hydrogen and methyl and $R_2$ is a member selected from the group consisting of alkyl containing from 1 to 20 carbon atoms, aralkyl containing from 7 to 10 carbon atoms, phenyl, naphthyl, 2-furyl, 2-thenyl, 2-pyridyl, 3-pyridyl, 4-pyridyl, cyclohexyl, 1-methyl-4-piperidyl, aryl substituted by alkyl containing from 1 to 4 carbon atoms, aryl substituted by chlorine, aryl substituted by hydroxyl, aryl substituted by 1 to 2 alkoxyl containing from 1 to 4 carbon atoms, aryl substituted by dialkylamine containing from 2 to 8 carbon atoms, the cis $C_3$ epimer of picropodophyllic acid having the formula $C_{22}H_{23}O_8$ being designated by the structure

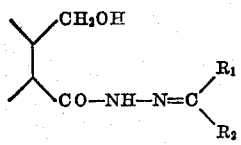

3. Podophyllic acid-n-dodecylidene hydrazide.
4. Podophyllic acid-n-tridecylidene hydrazide.
5. Podophyllic acid-n-tetradecylidene hydrazide.
6. Podophyllic acid phenylethylidene hydrazide.
7. Picropodophyllic acid 2-chloro-benzylidene hydrazide.
8. Podophyllic acid hexylidene hydrazide.
9. Podophyllic acid cyclohexylidene hydrazide.
10. Podophyllic acid (1-methyl-4-piperidylidene) hydrazide.
11. Podophyllic acid isopropylidene hydrazide.
12. Podophyllic acid thienylidene hydrazide.

References Cited in the file of this patent

UNITED STATES PATENTS 2,828,314     Yale et al. _____ Mar. 25, 1958

OTHER REFERENCES

Borsche et al.: Ann. Chem., vol. 499, page 76, 1932.
Ainsworth: J. Am. Chem. Society, vol. 76, page 5774, 1954.